Patented Sept. 18, 1945

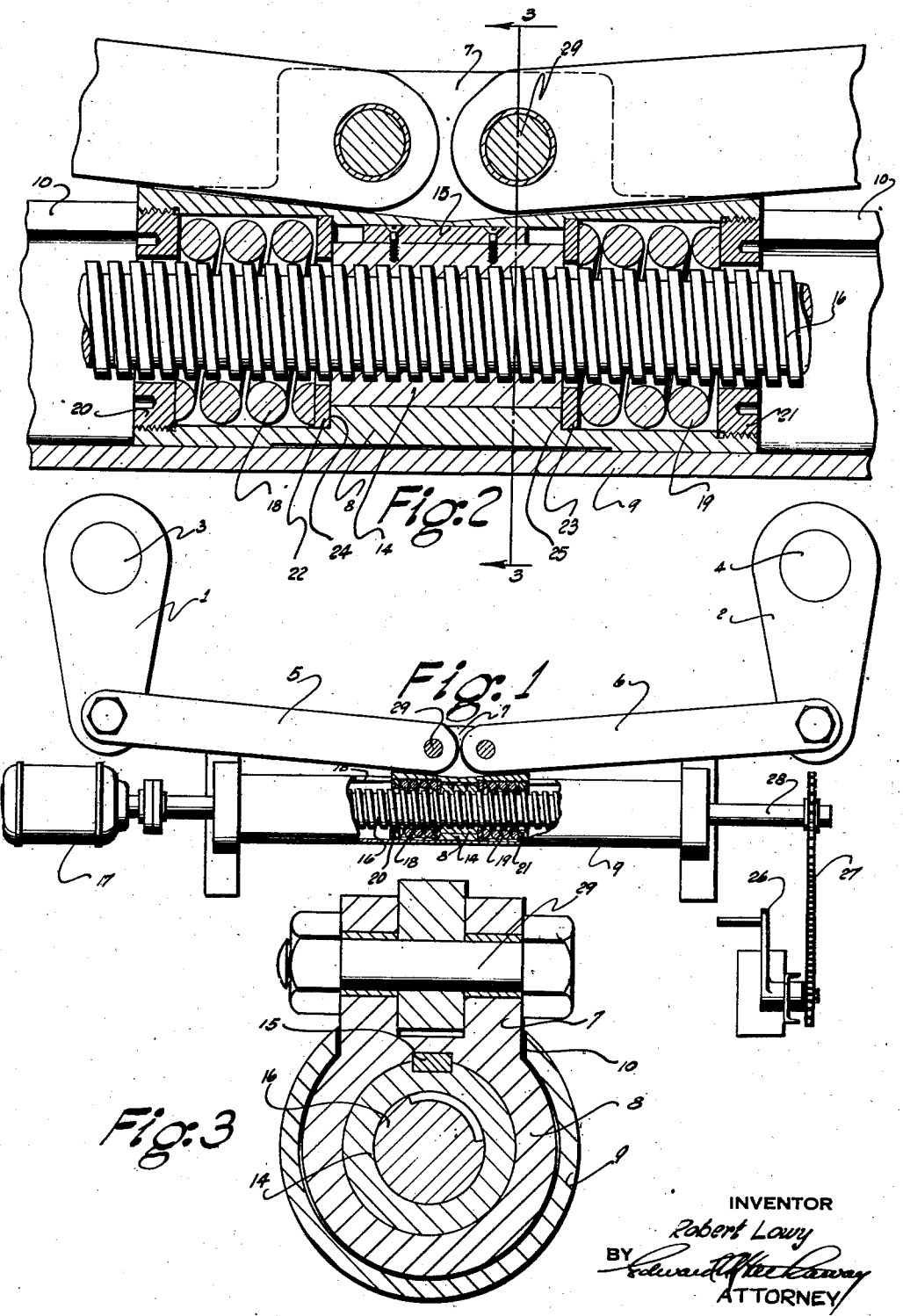

2,385,090

UNITED STATES PATENT OFFICE 2,385,090

STEERING GEAR FOR SHIPS

Robert Lowy, Philadelphia, Pa., assignor to The Baldwin Locomotive Works, a corporation of Pennsylvania Application March 22, 1944, Serial No. 527,527

3 Claims. (Cl. 114—157)

This invention relates generally to screw type steering mechanisms for ships and more particularly to ships having two rudders.

It is an object of my invention to provide an improved ship steering mechanism which operates simultaneously on both rudders and which is relatively simple and economical in construction, operation and maintenance combined with a high degree of ruggedness and flexibility of operation while at the same time being able to resist damage or abnormal wear in case of usual working loads as well as overloads.

Other objects and advantages will be more apparent to those skilled in the art from the following description of the accompanying drawing in which:

Fig. 1 is a plan view of my improved steering mechanism diagrammatically applied to a pair of tiller arms with parts broken away to show details of construction;

Fig. 2 is an enlarged longitudinal sectional view of one portion of my steering mechanism; and Fig. 3 is a transverse section taken on the line 3—3 of Fig. 2.

As shown in Fig. 1, a pair of tiller arms 1 and 2 are fixed on well-known rudder stocks 3 and 4 of a double rudder type steering mechanism. To operate these tiller arms simultaneously a pair of links 5 and 6 is pivotally connected to the arms and to a common element 7 which projects laterally from and is formed preferably integrally with a crosshead 8. This crosshead is preferably of circular cross-section as shown in Fig. 3, and is slidably guided in a circular crosshead guide which is of relatively simple and yet rugged construction by being in the form of a pipe 9. This pipe is slotted at 10 on one side through which the element 7 projects as shown in Figs. 2 and 3. To longitudinally shift crosshead 8 and thereby cause arms 5 and 6 to angularly adjust the tiller arms 1 and 2, I have provided a nut 14 slidably disposed and guided within a central portion of the crosshead while a key and keyway 15 prevent rotation of the nut. A screw 16, extending entirely through the crosshead guide 9, is suitably journalled in bearings supported in the ends of the crosshead and is rotatably driven in opposite directions by a suitable electric motor 17.

To insure a high degree of security against damage to the operating mechanism in the event of overload or other abnormal conditions, a pair of springs 18 and 19 are interposed between the ends of nut 14 and annular end pieces 20 and 21 removably threaded into the ends of crosshead 8. The inner ends of springs 18 and 19 are seated upon annular discs 22 and 23 to serve under normal loads to centralize nut 14 within crosshead 8, this by reason of the discs 22 and 23 bearing against shoulders 24 and 25 formed in the central portion of the crosshead and axially spaced apart a distance substantially equal to the length of the nut 14. Hence, the nut 14 may move to the left against the compression of spring 18 while the disc 23 acts against shoulder 25 and thus restrain any expansion of spring 19, or vice versa in the event of nut 14 moving to the right.

If the electrical motor 17 should fail for any reason, the screw may be easily manually rotated by a crank 26 and chain and sprocket connection 27 to an extension 28 of the screw. The pins 29 for connecting the links 6 and 7 to the crosshead may be of any suitable form and adequately bushed or otherwise constructed. Also the lateral element 7 may be bifurcated to receive the inner ends of links 5 and 6 and hold the same in position with maximum resistance to twisting.

From the foregoing disclosure it is seen that my improved operating mechanism is extremely simple and yet has a high degree of inherent ruggedness without involving complicated castings or other structures or mechanisms. The force in the connecting links 5 and 6 are, in general, nearly equal and will be of large magnitude for a given force applied to the screw. The proportions of the crosshead guide, such as its length, are such as to adequately take care of any eccentricity arising from extreme shifting of the crosshead 8 during operation but, in general, the links 5 and 6 and the tiller arms 1 and 2 operate with such small angular displacements that the whole device has a high degree of uniformity of action and minimum abnormal localized strains. In any event, however, if an abnormal load is applied to the rudders by a heavy sea the crosshead 14 can momentarily yield against either spring 18 or 19 and when the operating conditions are returned to normal, then the springs will centralize the crosshead as well as return the rudders to their previously adjusted position. Consequently there are no free gears and there are no large moving parts which could be damaged. It is possible to dispose the operating mechanism in such a manner that a maximum steering effect can be easily produced.

The steering effect of the rudders on the ship can be increased if the rudder on the inside of the turn will be placed under a greater deviation from the ship axis than the outside lying rudder. In this case, the radius of the turn will be smaller than by parallel working rudders. The arrangement shown in Fig. 1 embodies this improved steering effect by reason of the link and crosshead connections to the rudder arms. In the neutral (middle) position of the rudders, the links 5 and 6 are substantially parallel to the main axis of the screw 16 in which case the deviation of the rudders, that is, the angles of the rudder stocks 5 and 6, will be practically the same in both directions. When the rudders are turned the angles on both rudder stocks will be different, greater at the inside of the turn as required in accordance with the above theory of obtaining a small radius of turn.

It will of course be understood that various changes in details of construction and arrangement of parts may be made by those skilled in the art without departing from the spirit of the invention as set forth in the appended claims.

I claim:

1. An operating mechanism for a pair of ship rudders each having a usual tiller arm comprising, in combination, a rotatable screw and nut threaded thereon adapted to have relative axial movement with respect thereto upon rotation of the screw, a crosshead, a pair of springs respectively interposed between the ends of said nut and the ends of said crosshead to allow axial yielding of the crosshead upon occurrence of abnormal force applied to the crosshead, and substantially oppositely extending links connected at their inner ends to said crosshead and at their outer ends to the tiller arms of said rudders thereby to simultaneously operate the rudders upon rotation of the screw.

2. An operating mechanism for a ship rudder having a usual tiller arm comprising, in combination, a rotatable screw and nut threaded thereon adapted to have relative axial movement with respect thereto upon rotation of the screw, a crosshead, a pair of springs respectively interposed between the ends of said nut and the ends of said crosshead to allow axial yielding of the crosshead upon occurrence of abnormal force applied to the crosshead, means connecting said crosshead with the tiller arms, and said crosshead having a plurality of shoulders axially spaced apart a distance substantially equal to the length of said nut, and radial members adapted to seat against said shoulders and against the ends of said nuts when the latter are in a predetermined position, said springs biasing the nut and crosshead relatively to each other toward said predetermined position.

3. An operating mechanism for a ship rudder having a tiller arm comprising, in combination, a rotatable screw, a cylindrical pipe-like crosshead guide containing said screw and having a slot at one side, a nut on said screw, a crosshead connected to said nut for movement therewith and slidably supported within said pipe-like guide, said crosshead also having a laterally projecting portion extending through said slot in the side of said guide, and means connecting said laterally projecting portion with the tiller arm to operate the same upon rotation of the screw and consequent action of the nut.

ROBERT LOWY.